US012810456B2

(12) United States Patent
Steyvers et al.

(10) Patent No.: US 12,810,456 B2
(45) Date of Patent: Nov. 24, 2026

(54) METHOD FOR THE DESIGNING AND PRODUCTION OF A RENOVATION ELEMENT FOR A STAIRCASE PART

(71) Applicant: SIP B.V., Weert (NL)

(72) Inventors: Johannes Matheus Hendrikus Steyvers, Weert (NL); Rick Frederikus Antonius Steyvers, Weert (NL); Frederik Liefhebber, Weert (NL); Michel Gerardus Van Elk, Weert (NL)

(73) Assignee: SIP B.V., Weert (NL)

( * ) Notice: Subject to any disclaimer, the term of this patent is extended or adjusted under 35 U.S.C. 154(b) by 289 days.

(21) Appl. No.: 18/288,177

(22) PCT Filed: Apr. 27, 2022

(86) PCT No.: PCT/EP2022/061182
§ 371 (c)(1),
(2) Date: Oct. 24, 2023

(87) PCT Pub. No.: WO2022/229251
PCT Pub. Date: Nov. 3, 2022

(65) Prior Publication Data

US 2024/0202954 A1 Jun. 20, 2024

(30) Foreign Application Priority Data

Apr. 27, 2021 (NL) ..................................... 2028078

(51) Int. Cl.
*G06T 7/62* (2017.01)

(52) U.S. Cl.
CPC ...... *G06T 7/62* (2017.01); *G06T 2207/30204* (2013.01)

(58) Field of Classification Search
CPC ............. G06T 7/62; G06T 2207/30204; G06T 2207/30208
See application file for complete search history.

(56) References Cited

U.S. PATENT DOCUMENTS 6,960,272 B1 11/2005 Tokas et al.
8,516,771 B2 8/2013 Mang et al.
(Continued)

FOREIGN PATENT DOCUMENTS

CN 118247257 A * 6/2024 ............... G06T 7/62
EP 2825841 B1 11/2016
(Continued)

OTHER PUBLICATIONS

L. Naimark and E. Foxlin, "Circular data matrix fiducial system and robust image processing for a wearable vision-inertial self-tracker," Proceedings. International Symposium on Mixed and Augmented Reality, Darmstadt, Germany, 2002, pp. 27-36, doi: 10.1109/ISMAR.2002.1115065. (Year: 2002).*
(Continued)

*Primary Examiner* — Chan S Park
*Assistant Examiner* — Chandhana Pedapati
(74) *Attorney, Agent, or Firm* — Hodgson Russ LLP

(57) ABSTRACT

The current invention relates to a method for producing a renovation element suited for renovating or replacing a staircase part, said method comprises a digital measuring step, comprising the extraction of information regarding the dimensions of said staircase part, wherein a plurality of markers are positioned on said staircase part and wherein said markers are captured by a recording device, and analyzing said image by means of image analysis techniques, thereby defining the dimensions of the staircase part, and based on said dimensions, producing a renovation element
(Continued)

to be placed on the corresponding staircase position. The invention also relates to a method and a kit for producing a renovation element suited for renovating a staircase part.

18 Claims, 4 Drawing Sheets

(56) References Cited

U.S. PATENT DOCUMENTS

| | | | | |
|---|---|---|---|---|
| 10,796,183 | B2 * | 10/2020 | Topal | G06V 10/245 |
| 2016/0012611 | A1 * | 1/2016 | Wexler | G06T 7/62 382/103 |
| 2017/0243365 | A1 * | 8/2017 | Nuijten | B66B 9/0846 |
| 2020/0024849 | A1 * | 1/2020 | Blumer | G06F 30/13 |
| 2021/0164237 | A1 * | 6/2021 | Alfonsson | G06F 30/17 |

FOREIGN PATENT DOCUMENTS

| | | | | |
|---|---|---|---|---|
| GB | 2591152 | A * | 7/2021 | B66B 23/04 |
| WO | 2020067892 | A1 | 4/2020 | |

OTHER PUBLICATIONS

Anonymous. Handicare PhotoSurvey4D, Beechfield Healthcare, (Jan. 8, 2021), https://www.youtube.com/watch?v=xkj6W2BeJb0, [ date accessed: 2025-10-02]. (Year: 2021).*

Anonymous, StarBiz Brochure, (Feb. 10, 2019), https://www.stair.biz/downloads/StairBiz%20Brochure.pdf, [date accessed Oct. 3, 2025] (Year: 2019).*

Christopher Getschmann and Florian Echtler. Feb. 14, 2021. Seedmarkers: Embeddable Markers for Physical Objects. In Proceedings of the Fifteenth International Conference on Tangible, Embedded, and Embodied Interaction (TEI '21). Association for Computing Machinery, New York, NY, USA, Article 26, 1-11. (Year: 2021).*

Anonymous. Accurate stair measurement for complex staircases, Stanna Malta, (Mar. 22, 2020), https://www.youtube.com/watch?v=3bcOSFVCtw4, [date accessed: Feb. 17, 2026] (Year: 2020).*

WIPO, ISR for PCT/EP2022/061182, Aug. 11, 2022.

Photomodeler Technologies, The Other Photogrammetry Automation—Coded Target, Jan. 2018.

Photomodeler Official Channel, Photomodeler Automatic Targeted Project Tutorial, Oct. 2017.

Linearis3D, Stairs Measurement, Oct. 2019.

* cited by examiner

METHOD FOR THE DESIGNING AND PRODUCTION OF A RENOVATION ELEMENT FOR A STAIRCASE PART

FIELD OF THE INVENTION

The invention relates generally to the field of staircases, and in particular, to a method of renovating or refacing an existing staircase.

BACKGROUND

A conventional residential staircase includes horizontal step treads and vertical risers extending vertically between the treads. An open staircase (also called a floating staircase or open riser staircase) is a staircase where the spaces between the treads are open, rather than closed. Renovating an old residential staircase is conventionally done in one of two ways: either the old staircase is removed, and a new staircase constructed in place, or new treads are placed over the existing treads.

The first option is expensive, and requires skilled labor and familiarity with staircase construction, while the second option requires expert knowledge for measuring and producing new staircase elements.

Most staircases are built with stairs in which the tread overhangs the riser at the front of the tread. U.S. Pat. No. 6,960,272 discloses a method wherein a replacement tread is placed on and overhangs the old tread. The overhang is typically between three-quarters of an inch and one and one-half inches in residential construction. Often the overhanging portion of the tread is cut off when installing new tread over the existing tread, adding to labor cost and requiring cleanup of sawdust and cuttings. Additionally, measuring a staircase that is in need or renovation is a very time-consuming effort and requires the use of skilled personnel. This further adds to the workload and cost.

U.S. Pat. No. 8,516,771 shows a method of refacing a staircase having original treads and original risers with replacement treads and replacement risers. Each replacement tread overhangs a respective original riser by a distance greater than the thickness of the replacement riser. The method does not require removing the old staircase, does not require skilled labor and could even be successfully carried out by untrained person. However, the accurate measurement and adaptation of the staircase is still very laborious and requires expert knowledge.

A method for measuring a staircase is known from the field of stair lifts, as shown in WO 2020 067 892. WO 2020 067 892 discloses a staircase measuring method and system for obtaining spatial information on a staircase based on determining a device point on a distance measuring device, with respect to a staircase reference point on the staircase; and on determining a staircase point with respect to the device point, Hereby the staircase point is on the staircase or on a surface in an environment of the staircase. This leads to determining a vector between the staircase point and the staircase reference point, based on a vector between the staircase point and the device point, and a vector between the device point and the staircase reference point.

EP 2 825 841 highlights a computer program for the extraction of information about one or more spatial objects by a person. The program is designed for analyzing the sequence of images in real time, using image analysis techniques, and extracting information about said one or more objects. This information is communicated to the person in real time via the output means.

However, the state of the art highlights that performed measurements, needed for the renovation of an existing staircase, are often inaccurate, require specialized knowledge and infer significant manual labor. In case of 3D modeling of a staircase, the prior art often requires a high number of images and significant computational capacity. As such, none of the reported methods are adequate for measuring a staircase using digital and easily accessible methods.

In view of the above, there is a need for further improvement of methods for obtaining an accurate three-dimensional representation of a staircase in need of renovation.

The present invention aims to resolve at least some of the problems and disadvantages mentioned above.

SUMMARY OF THE INVENTION

The present invention and embodiments thereof serve to provide a solution to one or more of above-mentioned disadvantages. To this end, the present invention relates to a method for producing a renovation element suited for renovating a staircase part according to claim 1. More in particular, the invention comprises digitally measuring a staircase part by extraction of information regarding the dimensions of said staircase part. Said staircase part is in a preferred embodiment the treads, risers and noses of a staircase.

According to the invention, the method presents a digital measurement of a staircase part based on the use of markers. The markers are positioned on a surface of a staircase part such as a single staircase tread and corresponding riser followed by capturing the markers by a recording device. Hereby, a single image or video of the staircase part and corresponding markers is captured. The image is analyzed by image analysis techniques and dimensions of the staircase part are calculated. Based on the determined dimensions, a renovation element, to be placed on the corresponding staircase position, is produced. This method eliminates the need for manual measurements and reduces the chance of measuring errors. Because of the use of markers, measuring a staircase is straightforward and independent from the need for expensive and specialized equipment. A digital measurement can also be communicated directly to the production facility where a renovation element is produced. This adaptation saves time and labor during the process.

In a second aspect, the present invention relates to a system according to claim 13. More particular, the system as described herein provides a system designed to extract information regarding the dimensions of a staircase part, a recording device, a processing unit designed to process dimensional information, a transmitting device for relaying information to a production unit and a production unit for producing a renovation element. The system further comprises markers, wherein a marker is a positional tracking component used for the extraction of information, wherein said markers are designed to be positioned and/or attached to a surface of a staircase part of a staircase.

In a third aspect the present invention relates to a kit according to claim 18. The kit as described herein is advantageous for producing a renovation element to renovate a staircase part. The kit comprises a plurality of edge and center markers, a recording device, a processing unit, a transmitting device and a production unit. In the kit, a marker constitutes one or multiple submarkers, wherein a submarker is comprised of an outer and inner circle with pre-determined radius and center point, wherein the center of said circles coincides, wherein an individual submarker contains a unique featured code, wherein the ID code of the submarkers is instrumental for a determination of the orientation of a marker, wherein the ID code of the submarkers is instrumental for a determination of the identity of an individual marker.

DESCRIPTION OF FIGURES

The following description of the figures of specific embodiments of the invention is merely exemplary in nature and is not intended to limit the present teachings, their application or uses. Throughout the drawings, corresponding reference numerals indicate like or corresponding parts and features.

DETAILED DESCRIPTION OF THE INVENTION

Figure 1:
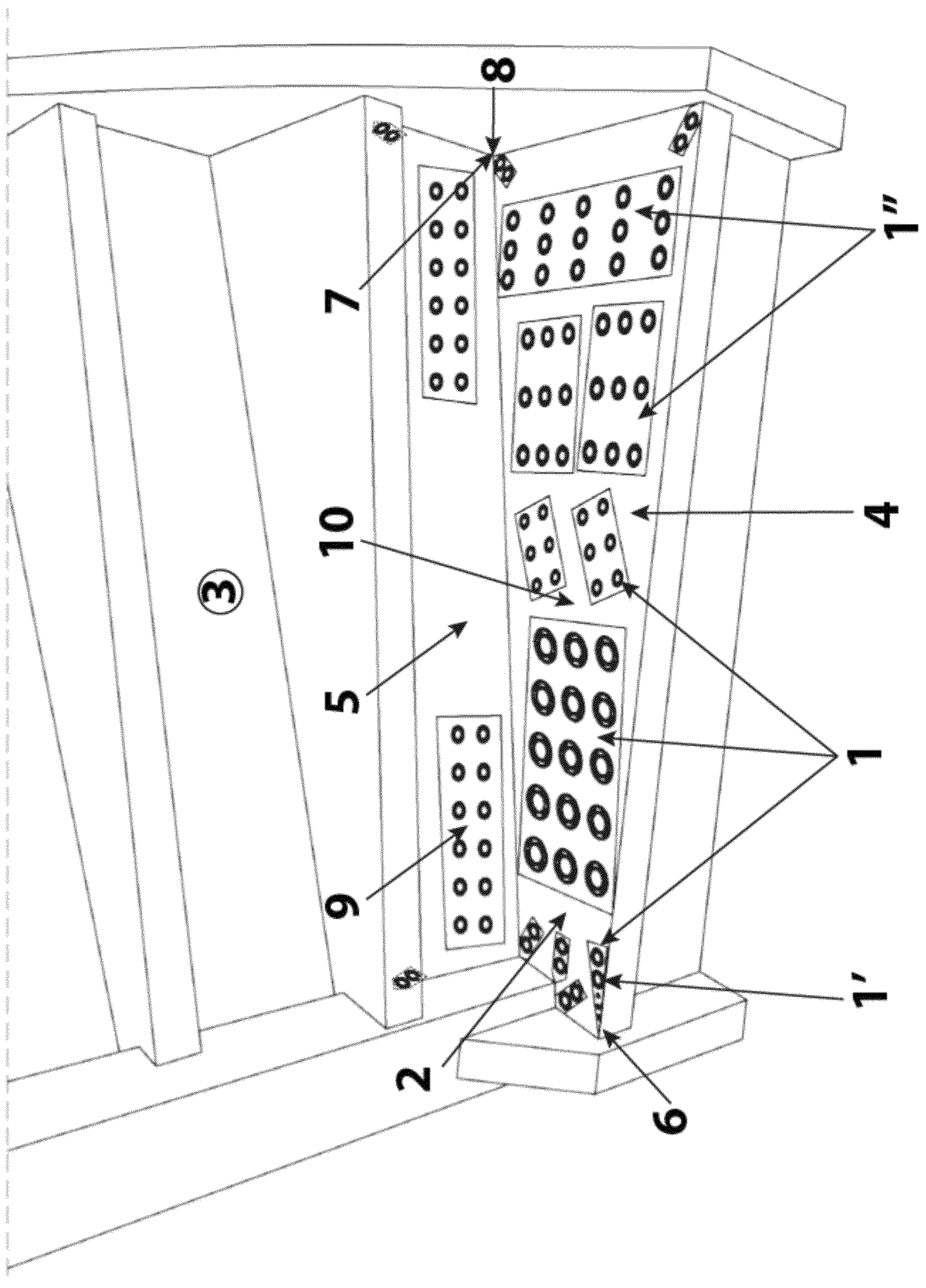
FIG. 1 shows a schematic representation of markers positioned on a staircase according to an embodiment of the present invention.

The present invention concerns a method for producing a renovation element suited for renovating and/or resurfacing a staircase.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings: A riser is the vertical surface of the staircase. The tread on the other hand is the horizontal surface of the staircase and the part of the staircase you step on. Nosing is the portion of the tread that overhangs the front of the riser. Often a stair builder will talk about the rise and run of the stair. The rise is the vertical dimension from tread to tread, while the run is the horizontal dimension from riser to riser (not including the nosing).

Renovations (also called remodeling) is the process of improving a broken, damaged, or outdated structure. Renovations are typically either commercial or residential. In the current invention, renovating a staircase can include providing a new tread and/or riser element to replace an existing staircase, providing a new tread and/or riser element to be fitted onto an existing staircase, applying protective and/or decorative elements to a staircase, resurfacing a staircase by application of carpet, stair runners, sound dampening elements, shock proof elements, providing light and/or sound elements. “A”, “an”, and “the” as used herein refers to both singular and plural referents unless the context clearly dictates otherwise. By way of example, “a compartment” refers to one or more than one compartment. “About” as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier “about” refers is itself also specifically disclosed. “Comprise”, “comprising”, and “comprises” and “comprised of” as used herein are synonymous with “include”, “including”, “includes” or “contain”, “containing”, “contains” and are inclusive or open-ended terms that specifies the presence of what follows e.g. component and do not exclude or preclude the presence of additional, non-recited components, features, element, members, steps, known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The recitation of numerical ranges by endpoints includes all numbers and fractions subsumed within that range, as well as the recited endpoints.

Whereas the terms “one or more” or “at least one”, such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to “one embodiment” or “an embodiment” means that a particular feature, structure or characteristic described in connection with the embodiment is included in at least one embodiment of the present invention. Thus, appearances of the phrases “in one embodiment” or “in an embodiment” in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In a first aspect, the invention provides a method for producing a renovation element suited for renovating a staircase part. Said staircase part may pertain to any part of a staircase that might need renovation or replacement. In a particular preferred embodiment said staircase part is a tread, riser or nose of a staircase, or a combination of the three.

The method includes the extraction of information regarding the dimensions of the staircase, more specifically of the treads, risers and/or noses of a staircase. By preference, the invention additionally provides a method suitable for extraction of information regarding the dimensions of a shoe, a shoe mold, a stringer fascia, a stringer capping, etc. of the staircase. By more preference, the invention also provides a method suitable for producing standard size renovation elements which can be adjusted according to obtained information regarding the dimensions of the staircase part.

The measurement of the staircase part comprises a digital measurement step, in contrast to the standard methods where this is performed manually. According to the state of the art this manual measurement required the intervention of a skilled person with the knowledge on how to efficiently and accurately measure a staircase. Staircases with irregular shape and increased number of corners takes a considerably higher amount of time and effort according to the state of the art. In the current invention one or multiple markers are positioned on a single staircase part (such as a tread and/or corresponding riser). These markers are positioned in corners as well as the center surface of the staircase. The markers on the surface are captured by recording device, and thereby capturing a single image of said staircase part and corresponding markers. The image is analyzed by means of image analysis techniques and defines the dimensions of a staircase part.

When making a 3D model of a staircase according to the state-of-the-art, it was necessary to capture a high number of photographs followed by a processing step of the information on a computer. An operator would also have difficulty knowing whether enough pictures have been taken and whether they have been taken correctly and with sufficient overlap for making a sufficiently accurate 3D model. This limitation is lifted in the current invention by the use of the specific markers in combination with a single image recorded per staircase surface. Use of the markers limits manual labor associated with the process and reduces the overall processing time. It represents a quick and reliable methods of obtaining information about the staircase.

Based on the dimensions determined from the single image, a renovation element is produced. The renovation element is to be placed on the corresponding staircase position. In recent years it has been gaining ground to renovate an existing staircase by means of staircase tread elements. This known stair renovation element provides in a typical possibility to improve and renovate household, public or industrial stairs in a typical way. The top side and/or the front side of a stair step after cleaning, and the measurement of the specific format and/or the shape of the stair step, are provided with a precisely placed stair renovation element. Such stair renovation elements are generally made from a suitable material such as MDF with a laminated top layer to provide a radiance like a parquet floor.

In a preferred embodiment, a contour or surface outline of a captured staircase part is determined based on the information relayed by the captured image and wherein said contours are fitted on said image. The determination of an outline is based on the information relayed by the image containing the position of the plurality of markers. Hereby will the software identify the markers and perform an iterative analysis connecting the outmost point of each marker. Connection lines are subsequentially drawn between these points, thus generating the contour. The contour is fitted on the captured image in order to transfer the contour onto the captured image. This adapts the image to the contour determined by use of the markers.

In an embodiment, contours of a captured staircase part are corrected by a predetermined offset. A renovation element is designed and produced based on the size calculations of the staircase part, wherein the renovation element fits on top of the measured surface of the staircase. However, if the produced renovation element would have the exact dimensions as the existing staircase, it would be impossible to fit the element on the existing staircase without causing damage to the original staircase. According to the current invention, the dimensions of the renovation element are therefore corrected by a predetermined offset. This offset allows to fit the renovation element on the existing staircase without causing tension or damage. The adaptation increases staircase remodeling speed and reduces manual labor.

Preferably, a measurement of a surface of a staircase part includes the measurement of the surface of a tread and the measurement of the surface of a riser. This allows the production of a renovation element that fits perfectly on the staircase in need of renovation. By including both the tread and the riser in the measurement, less renovation elements need to be fitted on the existing staircase and the production efficiency of the renovation elements increases. Therefore, an existing staircase can be remodeled fast and with minimal effort.

The data obtained can be utilized by any means known to the skilled person in the downstream production flow. Preferably, said data is inputted and processed in a computer controlled production environment. In a preferred embodiment, data regarding the obtained image and corrected contours are transferred to one or more Computer Numerical Control (CNC) machines suited for production of a renovation element. Said machines may include but are not limiting to drilling machines, sawing machines, planing machines.

The current invention equally allows the production of an open renovation element. In the current invention, a CNC environment will direct the production of a renovation element based on the input provided by the image and corrected contours. Preferably, a renovation element is produced with a finishing coating on the surface of the tread facing outward of the staircase and with a finishing coating on the surface of the riser facing outward and inward of the staircase. This adaptation allows to efficiently renovate various types of staircases, including open staircases, and eliminates the need to produce manually measured and finished renovation elements in case of remodeling open staircases into a closed staircase configuration. An open staircase (also called a floating staircase or open riser staircase) is a staircase where the spaces between the treads are open, rather than closed. In the past, staircases have traditionally had risers that connect each step. By preference, a renovation element can be produced by any suitable material in the art, such as wood, plywood, medium-density fiberboard (MDF), high-density fiberboard (HDF), high-pressure laminate (HPL), low-pressure laminate (LPL), low-pressure melamine (LPM), metal (such as aluminum, stainless steel or bronze), stone (such as marble or granite), concrete (with or without reinforcement), resin, glass, plexiglass or acrylic. In a preferred embodiment, said renovation element is manufactured from wood, plywood, medium-density fiberboard (MDF), high-density fiberboard (HDF), high-pressure laminate (HPL), low-pressure laminate (LPL), low-pressure melamine (LPM).

In one embodiment, at least two types of markers are used. Said different types of markers are divided into edge markers and center markers. Edge markers are positioned at a corner of the surface and indicate where a surface has indentations or protrusions. The center markers are positioned at a substantial center of the surface and indicate the inner section of the surface. The inventors have unexpectedly observed that the position of the center markers allows for an accurate surface measurement and ensures that the position of the edge markers is calculated correctly. Without the use of the center markers, the position of the edge markers is less accurately registered.

In one embodiment, each marker contains one or multiple submarkers on its surface. A submarker is comprised of an outer and inner circle with pre-determined radius and center point, wherein the center of said circles coincides. As such, the circles are concentric. The design of the submarkers determines the accuracy by which the submarkers are recognized by the computer software. The inventors determined that the combination of concentric circles allows for a very accurate analysis. By using the specific design of the submarkers, the information obtained is much more accurate and reproducible. This increases the accuracy of the measurement of a staircase part significantly, permitting an accurate three-dimensional representation. Additionally the submarkers are designed to contain high contrast. Preferably the submarkers are designed in black-and-white. The high contrast allows the efficient readout by an analysis software.

In an embodiment, an individual submarker contains a unique ID code. The ID code of the submarkers allows a determination of the orientation of a marker that is positioned on the surface, wherein the ID code of the submarkers allows a determination of the identity of an individual marker. As such, the submarkers each have their own unique, detectable feature. The information gathered from the submarkers is stored as an algorithm in an operating system. This information is utilized during digital measurement and image analysis.

Preferably, the markers are placed on a surface of a staircase part before an image is recorded by means of the device. The submarkers have a shape such that they can take up a detectable spatial orientation in an image. The computer program is designed to determine the spatial position and orientation of the markers on the basis of the features in the submarkers detected in the image, and to use the information of the determined position and orientation of the markers during the recording of each of the images upon extracting the aforesaid information about a surface. As a result, a set of clearly recognizable points is measured, so that the position of the camera can be determined with a high degree of precision.

In an embodiment, a recording device is a camera that captures an image of the staircase part provided with markers positioned on the surface and transmits the image to a processing unit comprising a computer program. Capturing an image by a camera will be performed by a client or by a skilled person in charge of renovating a staircase. Both in case of a client or a skilled person taking the image, the captured image will be transmitted to the computer program for downstream analysis. Therefore this method is suitable for both unexperienced persons and persons with skills and knowledge, making the method widely available and applicable.

Potential types of cameras include the DSLR cameras, point-and-shoot cameras, mirrorless cameras, tablet cameras and smart phone cameras. The camera is preferably a tablet or a smartphone camera, which are commercially available. The recording device preferably comprises an acceleration sensor and/or gyroscope, which is connected to the central processing unit, wherein the program is designed to determine, based on information from the acceleration sensor and/or gyroscope, whether the camera is at least substantially stationary in the space, and to record an image from the camera in the sequence of images at that moment. In this way sharp images can automatically be recorded.

The transmission of the captured images occurs by a wireless signal or by a storage medium. Preferably, the transmission happens wireless. Wireless communication (or just wireless, when the context allows) is the electromagnetic transfer of information between two or more points that do not use an electrical conductor as a medium by which to perform the transfer. The most common wireless technologies use radio waves. With radio waves, intended distances can be short, such as a few meters for Bluetooth or as far as millions of kilometers for deep-space radio communications. It encompasses various types of fixed, mobile, and portable applications, including two-way radios, cellular telephones, digital cameras, and wireless networking.

In an embodiment, the computer program processes the image, wherein the program identifies the markers by means of the submarkers and wherein positional data is retrieved by means of the centers of said submarkers.

Photogrammetry is the science and technology of obtaining reliable information about physical objects and the environment through the process of recording, measuring and interpreting photographic images and patterns of electromagnetic radiant imagery and other phenomena. There are many variants of photogrammetry. One example is the extraction of three-dimensional measurements from two-dimensional data (i.e. images); for example, the distance between two points that lie on a plane parallel to the photographic image plane can be determined by measuring their distance on the image, if the scale of the image is known. According to the current invention, the markers comprising the submarkers provide data regarding the scale, the direction and the orientation. Preferably, the software equipped with the custom algorithm used in the invention allows also the definition of a position of a marker on the picture, as being either horizontal or vertical. This allows for accurate 3D measurement from a single image. This adaptation provides a significant improvement compared to the state of the art.

Photogrammetry has been used for the precise three-dimensional (3D) reconstruction of objects from images for many years. Generally the 3D reconstruction of objects can be performed using stereo image pairs. The primary approach for 3D object reconstruction using 2D images (photographs) is based on a bunch of overlapped images in close-range photogrammetry. Recovering a complete, detailed and accurate 3D model from images is a difficult task if uncalibrated images are used. Additionally precise calibration and orientation procedures, which are all based on manual or semi-automated measurements, are required.

The current invention allows for reliable reconstruction and measurements when only a single photograph is taken. Providing metric information and 3D object reconstruction from a single image is difficult. The markers of the current invention make it possible to extract measurement information about the staircase part and to reconstruct the 3D model by means of a single photo.

The current invention utilizes algorithms to derive measurement data from a single image. In order to achieve a measurement, the algorithm will thus process the identity and orientation of the markers in the image. Preferably the algorithm will assume a horizontal and/or vertical orientation of a marker. Using said collected data, the algorithm will determine the position and orientation of the camera in relation to the markers and correct said image for potential distortions. The algorithm will assign designated points on the image determined by the markers and generate a contour of a staircase part based on the calculated and assigned points. The algorithm will connect every point and classify the connecting lines as contour lines. Based on the generated contour, the algorithm will correct said contour with a predetermined offset prior to production. In another embodiment, the offset correction may occur at a later stage, for instance just prior to production, by means of thereto designed software tools.

In one embodiment, the computer program determines the validation of the transmitted image, wherein parameters regarding image quality and identification of the markers are evaluated, wherein image analysis proceeds upon confirmation of the parameters. In order to perform a valid analysis, the image quality is determined. Image quality can refer to the level of accuracy in which different imaging systems capture, process, store, compress, transmit and display the signals that form an image. Identification of the markers is evaluated by the ability of the software to register and identify the markers and associated submarkers.

In an embodiment, the actual size of the surface of the staircase part is calculated by the computer program based on the contour or surface outline. The computer program may correct the generated outline for lens distortion, angle variation and distance of the camera. These types of corrections allow for the calculation of real dimensions from a 2D image.

In an embodiment, said method comprises the following steps:

- capturing an image with a camera of a staircase part that is to be renovated, wherein said a tread and/or a riser of said staircase part is provided with markers, said markers comprise submarkers on their surface, and wherein image displays said staircase part and markers;
- analyzing said image by means of a computer-implemented algorithm, said algorithm defines positional information of said markers based on said capture image; positional information of said camera in view of said markers and information on the lens distortion of said camera;
- defining a contour of said staircase part based on information obtained in said previous step;
- defining, based on said obtained contours, a model for a renovation element, to be produced and placed on said existing stair tread.

In a preferred embodiment, a method flow will be as follows:

In a first step, an image is captured of a staircase part provided with one or multiple markers as described herein.

In a second step, the picture is processed. More specifically, both the position as well as the identity of the marker(s) (including the distance of the submarkers present on said markers) present on the captured picture are defined by a trained computer-implemented algorithm. Said algorithm will also define the position of the marker on the picture and thus staircase part, being either horizontal or vertical.

Subsequently, said algorithm will define, based on the deducted information of the marker:

- The position and orientation of said marker(s) on said staircase
- The position and orientation of the camera in view of said marker(s)
- The lens distortion In a fourth step, all submarkers of each marker present in said image are calculated.

Based on the information that is obtained in the previous steps, a contour of the staircase part (such as tread and riser) of the image is defined. All outlines of said contour are classified. The calculated contour is subsequently mapped on the staircase part of the image. Finally, in a last step, margins are calculated, based on the classification of said outlines.

In an embodiment, a marker is produced out of a plastic polymer. The use of plastic polymer, such as polyvinyl chloride, polyethylene or polypropylene, ensures that a marker retains its form. As the image analysis is calibrated on the dimensions of the markers, it is imperative that these dimensions stay unaltered over time. If a marker would shrink or bend, it would seriously hamper the staircase measurements. For this reason, markers constructed out of paper, cardboard or wood are less suited. Alternatively, a marker can be constructed out of a ferritic alloy under the condition that oxidation or corrosion does not occur, a resin, a high-quality medium-density fiberboard (MDF) or high-density fiberboard (HDF), polyurethane board.

In a second aspect, the invention provides a system for producing a renovation element suited for renovating a staircase part comprising a digital measurement system designed to extract information regarding the dimensions of said staircase, a recording device, a processing unit designed to process said dimensional information, a transmitting device for relaying said information to a production unit and a production unit for producing a renovation element. The digital measurement system is based on the use of one or multiple markers, wherein a marker is a positional tracking component used for the extraction of information. According to the system the markers are positioned on a surface of the staircase, wherein said markers are designed to be positioned and/or attached to a surface of a staircase part of a staircase. The output is relayed to a processing unit, and a computer program is designed for analyzing the image, using image analysis techniques, and extracting dimensional information about the staircase.

In preference, the recording device records a single image containing the markers and the supporting surface. This is in contrast with the state-of-the-art where multiple images need to be taken to allow a software to calculate a three-dimensional position and to derive a measurement regarding the staircase. In the current invention, the use of a single image reduces the incidence of false measurements and decreases the processing time needed for the calculations.

In an embodiment, markers are divided into edge markers and center markers, wherein edge markers are positioned at a corner of the surface, wherein center markers are positioned at a substantial center of the surface. The use of center markers, which identify the surface area not in contact with a corner or edge, allows for a correct determination of the position of the edge markers, which define the corners of the surface to be measured.

In an embodiment, a marker constitutes one or multiple submarkers, wherein a submarker is comprised of an outer and inner circle with pre-determined radius and center point, wherein the center of said circles coincides. As stated above, the design of the submarkers determines the accuracy by which the submarkers are recognized by the computer software. The inventors determined that the combination of concentric circles allows for a very thorough analysis. By using the specific design of the submarkers, the information obtained is much more efficient and reproducible. This increases the accuracy of the measurement of a staircase part significantly, permitting an optimal three-dimensional representation.

In an embodiment, an individual submarker contains a unique featured code. In this regard, the ID code of the submarkers allows a determination of the orientation of a marker that is positioned on the surface, and the ID code of the submarkers also allows a determination of the identity of an individual marker.

In a preferred embodiment, the computer program is able to process the image, wherein the program is capable of identifying the markers by analysis of the position of the submarkers, wherein the center point of the circles of the submarkers is suitable for determining the position of the marker, wherein the computer program is capable of determining the validation of the transmitted image, permissive of an evaluation of parameters regarding image quality and identification of the markers, wherein image analysis is able to proceed upon confirmation of the parameters.

In a third aspect, the invention relates to a kit to be used for performing a digital measurement of a staircase part for the purpose of renovating said staircase, said kit comprises a plurality of edge and center markers, a recording device, a processing unit, a transmitting device and a production unit.

A marker constitutes one or multiple submarkers, wherein a submarker is comprised of an outer and inner circle with pre-determined radius and center point, wherein the center of said circles coincides, wherein an individual submarker contains a unique featured code, wherein the ID code of the submarkers is instrumental for a determination of the orientation of a marker, wherein the ID code of the submarkers is instrumental for a determination of the identity of an individual marker.

Preferably, the markers in the kit are divided into edge markers and center markers. Edge markers are designed to be positioned at a corner of the surface, wherein center markers are designed to be positioned at a substantial center of the surface. In an embodiment of the kit, a marker is produced out of a plastic polymer. The use of plastic polymer, such as polyvinyl chloride, polyethylene or polypropylene, ensures that a marker retains its form. As the image analysis is calibrated on the dimensions of the markers, it is imperative that these dimensions stay unaltered over time. If a marker would shrink or bend, it would seriously hamper the staircase measurements. For this reason, markers constructed out of paper, cardboard or wood are unsuited. Alternatively, a marker can be constructed out of a ferritic alloy under the condition that oxidation or corrosion does not occur, a resin, a high-quality medium-density fiberboard (MDF) or high-density fiberboard (HDF), polyurethane board.

The Present Invention May be Described by the Following Embodiments:

1. A method for producing a renovation element suited for renovating a staircase part, said method comprises a digital measuring step, said digital measuring step comprises the extraction of information regarding the dimensions of said staircase or part, wherein one or more markers are positioned on a staircase part and wherein said markers are captured by a recording device, thereby capturing a single image of said staircase part and corresponding markers and analyzing said image by means of image analysis techniques, thereby defining the dimensions of the staircase part, and based on said dimensions, producing a stair renovation element to be placed on the corresponding staircase position or to replace said staircase part.
2. Method according to embodiment 1, wherein, contours of a captured staircase part are determined based on the information relayed by the captured image and wherein said contours are fitted on said image.
3. Method according to embodiment 2, wherein, said contours of a captured staircase part are corrected by a predetermined offset.
4. Method according to any of the embodiments 1-3, wherein, data regarding the image and corrected contours are transferred to a Computer Numerical Control (CNC) machine for production of a renovation element.
5. Method according to any of the embodiments 1-4, wherein edge markers and center markers are utilized, wherein said edge markers are positioned at a corner of the staircase part, and wherein said center markers are positioned at a substantial center of the surface of a staircase part.
6. Method according to any of the embodiments 1-5, wherein each marker comprises on its surface one or more submarkers, wherein a submarker is comprised of an outer and inner circle with pre-determined radius and center point, wherein the center of said circles coincides.
7. Method according to embodiment 6, wherein each submarker contains a unique ID code wherein said code allows determining the orientation and identity of said marker positioned on said staircase part.
8. Method according to any of the embodiments 1-7, wherein, a camera captures an image of the staircase part provided with markers positioned on the surface and transmits the image to a processing unit comprising a computer program, wherein the transmission occurs by a wireless signal or by a storage medium.
9. Method according to any of the embodiments 1-8, wherein, the computer program processes the image, wherein the program identifies the markers by means of the submarkers and wherein positional data is retrieved by means of the centers of said submarkers.
10. Method according to any of the embodiments 1-9, wherein, the computer program determines the validation of the transmitted image, wherein parameters regarding image quality and identification of the markers are evaluated, wherein image analysis proceeds upon confirmation of the parameters.
11. Method according to any of the embodiments 1-10, wherein, the actual size of the surface of the staircase part is calculated by the computer program based on the contours, wherein the computer program corrects for lens distortion, angle variation and distance of the camera.
12. Method according to any of the previous embodiments, said method comprises:
    - capturing an image with a camera of a staircase part that is to be renovated, wherein a tread and/or a riser of said staircase part is provided with markers, said markers comprise submarkers on their surface, and wherein image displays said staircase part and markers;
    - analyzing said image by means of a computer-implemented algorithm, said algorithm defines positional information of said markers based on said capture image; positional information of said camera in view of said markers and information on the lens distortion of said camera;
    - defining a contour of said staircase part based on information obtained in said previous step;
    - defining, based on said obtained contours, a model for a renovation element, to be produced and placed on said existing staircase tread.

13. Method according to any of the previous embodiments, wherein said staircase part is a stair tread, preferably comprising a tread, a nose and a riser.
14. Method according to any of the embodiments 1-13, wherein, said markers are made of a polymer such as polyvinyl chloride, polyethylene or polypropylene.
15. A system for producing a renovation element suited for renovating a staircase part comprising a digital measurement system designed to extract information regarding the dimensions of said staircase, a recording device, a processing unit designed to process said dimensional information, a transmitting device for relaying said information to a production unit and a production unit for producing a renovation element, wherein, a system further comprises markers, wherein a marker is a positional tracking component used for the extraction of information, wherein said markers are designed to be positioned and/or attached to a surface of a staircase part of a staircase.
16. System according to embodiment 15, wherein, markers are divided into edge markers and center markers.
17. System according to embodiment 15 or 16, wherein, each marker comprises one or more submarkers, wherein a submarker is comprised of an outer and inner circle with pre-determined radius and center point, wherein the center of said circles coincides.
18. System according to embodiment 17, wherein, an individual submarker contains a unique featured code, wherein ID codes of the submarkers allow a determination of the orientation of a marker that is positioned on the surface, wherein ID codes of the submarkers allow a determination of the identity of an individual marker.
19. System according to any of the embodiments 15-18, wherein, the computer program is able to process the image, wherein the program is capable of identifying the markers by analysis of the position of the submarkers, wherein the center point of the circles of the submarkers is able to determine the position of the marker, wherein the computer program is capable of determining the validation of the transmitted image, permissive of an evaluation of parameters regarding image quality and identification of the markers, wherein image analysis is able to proceed upon confirmation of the parameters.
20. A kit to be used for performing a digital measurement of a staircase part for the purpose of renovating said staircase, said kit comprises a plurality of edge and center markers, a recording device, a processing unit, a transmitting device and a production unit, wherein, a marker constitutes one or multiple submarkers, wherein a submarker is comprised of an outer and inner circle with pre-determined radius and center point, wherein the center of said circles coincides, wherein an individual submarker contains a unique featured code, wherein the ID code of the submarkers is instrumental for a determination of the orientation of a marker, wherein the ID code of the submarkers is instrumental for a determination of the identity of an individual marker.
21. Kit according to embodiment 20, wherein, a marker is produced out of a plastic polymer.

The invention is further described by the following non-limiting examples which further illustrate the invention, and are not intended to, nor should they be interpreted to, limit the scope of the invention.

The present invention will be now described in more details, referring to examples that are not limitative.

DESCRIPTION OF FIGURES

With as a goal illustrating better the properties of the invention the following presents, as an example and limiting in no way other potential applications, a description of a number of preferred applications of the method for examining the state of the grout used in a mechanical connection based on the invention, wherein:

FIG. 1 shows a schematic representation of markers 1 positioned on a surface of a staircase according to an embodiment of the present invention. The process starts by placing markers 1 on the surface 2 of the staircase 3, whereby markers 1 are placed both on the tread 4 of a staircase 3 and on the corresponding riser 5 of the staircase 3. Markers 1 are divided into edge markers 1' and center markers 1". Edge markers 1' are arrow-shaped 6 and designed to be placed near corners 7, whereby the tip 8 of the edge markers 1' points to the corner. Center markers 1" are rectangular 9 and are placed around the middle 10 of the surface 2. It will be clear to a skilled person that also other forms, other than rectangular markers, can be used. A single edge marker 1' is positioned in each corner 7 of the surface 2 of the tread 4 or riser 5. One or a multitude of center markers 1" are positioned around the middle of the tread 4 or riser 5. A camera records an image of the surface 2 containing the various markers 1. The image is sent from the camera to a software program for image analysis. The software program first checks the quality of the recorded image by verifying the identification of the surface 2 of the staircase 3 and the markers 1 present on the surface. In a next step the software detects the specific markers 1 in the image. The position and direction of the various markers 1 is analyzed and transformed into two-dimensional coordinates.

Figure 2:
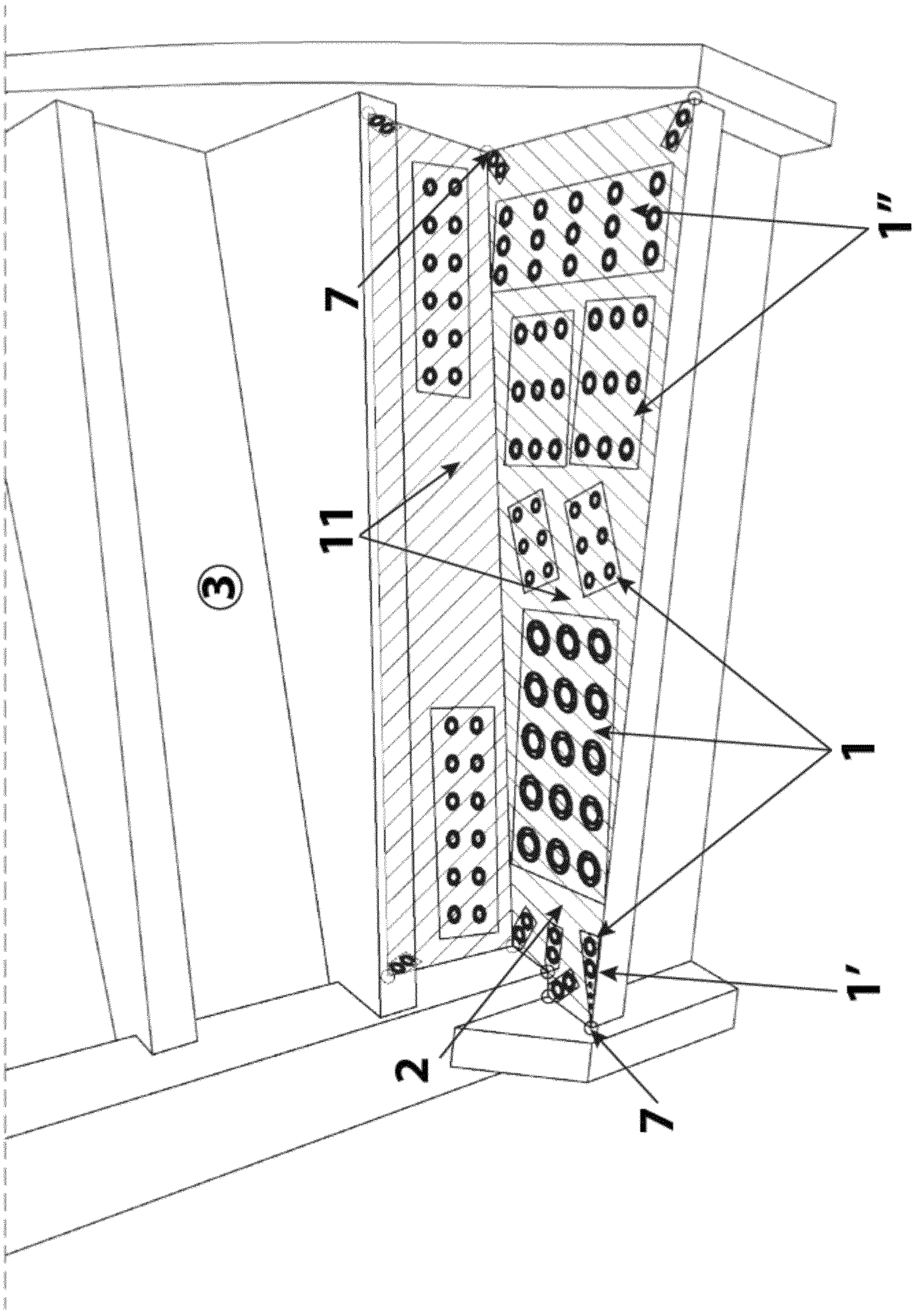
FIG. 2 shows a schematic representation of an outline defined by markers positioned on a staircase according to an embodiment of the present invention.

FIG. 2 shows a schematic representation of an outline 11 defined by markers 1 positioned on a staircase 3 according to an embodiment of the present invention. Based on the captured image, the imaging software determines an outline 11 of the imaged surface 2. The outline 11 is based on the connection of the corners 7 identified in the surface 2 of the staircase 3. A corner 7 is determined by the position and orientation of an edge marker 1'. The outline 11 is in a first step adjusted by the analysis of the center markers 1" to ensure that the corners 7 are correctly connected. The image is subsequently corrected for potential lens distortions caused by the angle of the camera and the distance of the camera to the surface 2. The two-dimensional coordinates obtained from the captured image and the parameters obtained from the camera are next computationally processed into three-dimensional coordinates. The software finally determines the actual dimensions of the surface 2.

Figure 3:
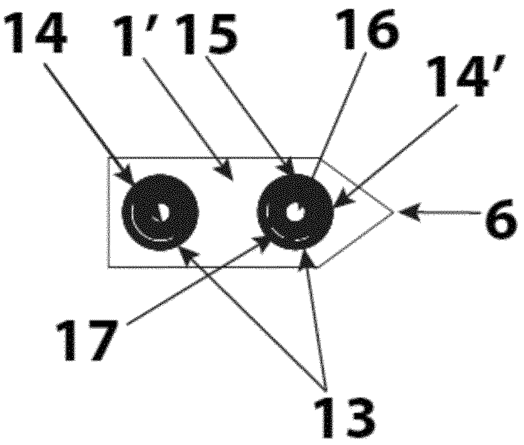
FIG. 3 shows a detailed representation of an edge marker according to an embodiment of the present invention.

FIG. 3 shows a detailed representation of an edge marker 1' according to an embodiment of the present invention. An edge marker 1' is arrow-shaped 6 with the tip 12 of the arrow pointed at a corner 7 of the surface 2 of a staircase 3. An edge marker 1' comprises one or a multitude of submarkers 13. A submarker 13 comprises two or more concentric circles 14 with the filling of the concentric circles alternating between black 15 and white 16, the largest circle 14' starting with a black 15 filling. A largest circle 14' of a submarker 13 comprises a unique ID code 17, allowing an identification of a marker 1.

Figure 4:
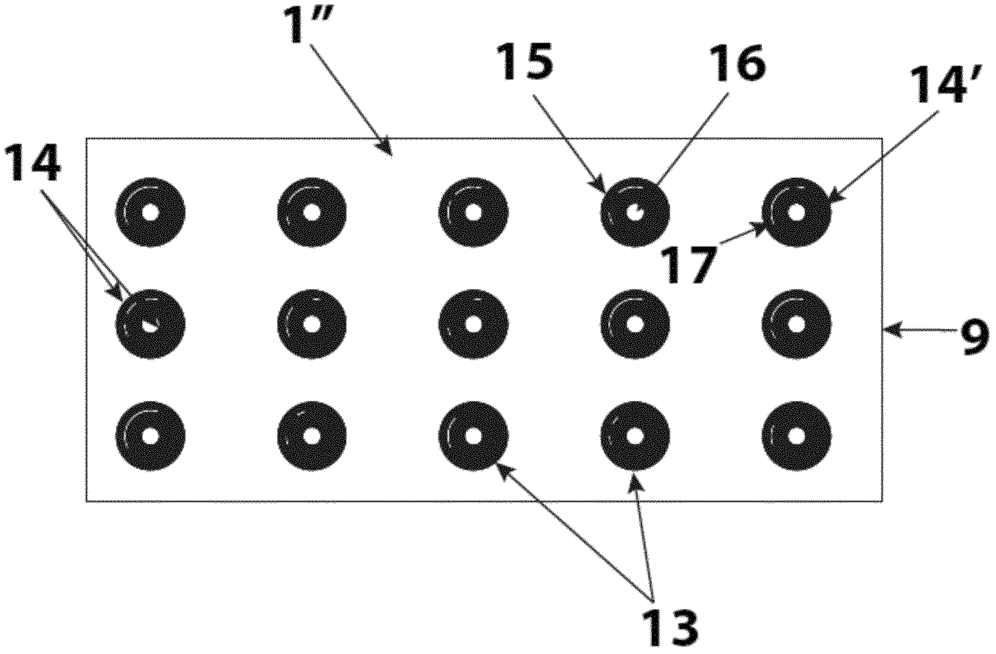
FIG. 4 shows a detailed representation of a center marker according to an embodiment of the present invention.

FIG. 4 shows a detailed representation of a center marker 1" according to an embodiment of the present invention. A center marker 1" is rectangle-shaped 9 and is positioned on the inner section away from the edges of the surface 2 of a staircase 3. A center marker 1" comprises one or a multitude of submarkers 13. A submarker 13 comprises two or more concentric circles 14 with the filling of the concentric circles alternating between black 15 and white 16, the largest circle 14' starting with a black 15 filling. A largest circle 14' of a submarker 13 comprises a unique ID code 17, allowing an identification of a marker 1.

Figure 5:
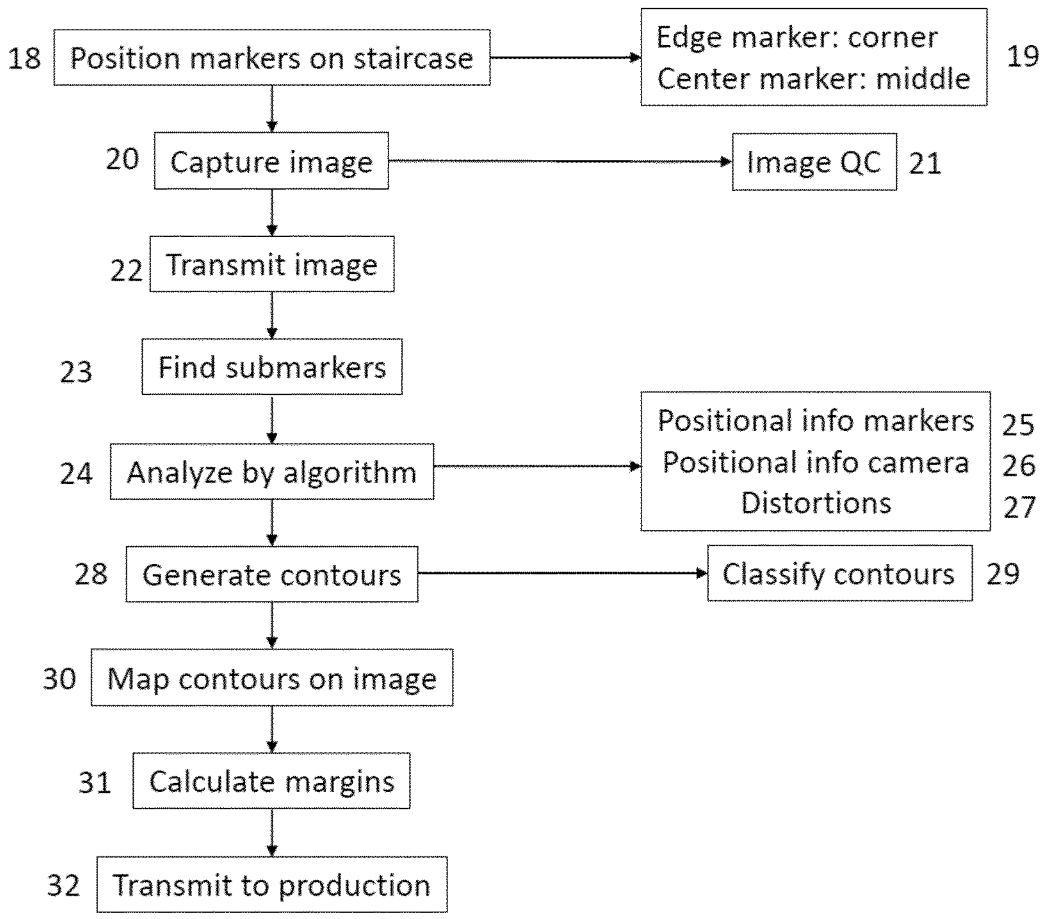
FIG. 5 shows a flow diagram of steps associated with the staircase measuring method.

FIG. 5 shows a flow diagram of steps associated with the staircase measuring method. The method starts by placing markers on the surface of a tread and riser of a staircase part that is to be renovated 18. Markers are divided into edge markers that are placed at the corners, and center markers that are placed around the middle of the surface of a staircase part 19. An image is captured with a camera, wherein the displays the staircase part (such as tread and riser) and markers 20. A first quality control of the image is performed 21. The quality control verifies that the staircase part and markers are in frame and visible. Upon confirmation, the image is wirelessly transmitted to a computer system 22. The software will find all submarkers of each marker present in the image 23. The computer system comprises a computer-implemented algorithm 24. The algorithm first defines positional information of the markers based on the captured image 25. Both the position as well as the identity of the marker(s) (including the distance of the submarkers present on the markers) present on the captured picture are defined. The algorithm will also define the position of the marker on the picture and thus staircase, being either horizontal or vertical. Next, the algorithm will define positional information of the camera in view of the markers, thus defining the position and orientation of the camera 26. Thirdly, the algorithm will define potential lens distortion of the camera 27. Based on the information that is obtained in the previous steps, the algorithm will define a contour of the staircase part (tread and riser) of the image 28. All outlines of the contour are classified 29. The calculated contour is subsequently mapped on the staircase part of the image 30. In a next step, the algorithm or a second algorithm will apply a predetermined offset to the contour and calculate margins 31, based on the previous classification of the outlines 29. Finally, the margins are transmitted to a production unit for the production of a renovation element 32.

The invention claimed is:

1. A method for producing a renovation element suited for renovating or replacing a staircase part, said method comprises:

a digital measuring step, said digital measuring step comprises extraction of information regarding dimensions of said staircase part, characterized in that one or more markers are positioned on the staircase part that is to be renovated, wherein said markers are captured by a recording device, thereby capturing only a single image of said staircase part and corresponding markers and analyzing said single image by means of image analysis techniques, thereby defining the dimensions of the staircase part, wherein the markers include edge markers and center markers, wherein said edge markers are positioned at a corner of the staircase part, and wherein said center markers are positioned at a center of a surface of the staircase part, transferring data regarding the single image and corrected contours to a Computer Numerical Control (CNC) machine for production of the renovation element, and producing a stair renovation element to be placed on a corresponding staircase position or to replace said staircase part based on said dimensions using the CNC machine.

2. The method according to claim 1, wherein the method further comprises determining contours of the staircase part in the single image based on information relayed by the single image and fitting said contours of the staircase part on said single image.

3. The method according to claim 1, wherein said contours of the staircase part in the single image are corrected by a predetermined offset.

4. The method according to claim 1, characterized in that the CNC machine is a drilling machine, a sawing machine, and/or a planing machine.

5. The method according to claim 1, wherein each of the one or more markers comprises on its surface one or more submarkers, wherein a submarker is comprised of an outer and inner circle with pre-determined radius and center point, wherein centers of said inner circle and said outer circle coincide.

6. The method according to claim 5, wherein each of the one or more submarkers contains a unique ID code wherein said unique ID code allows determining an orientation and identity of said marker positioned on said staircase part.

7. The method according to claim 1, wherein a camera captures an image of the staircase part provided with markers positioned on the surface and transmits the image to a processing unit comprising a computer program, wherein the transmission occurs by a wireless signal or by a storage medium.

8. The method according to claim 7, wherein the computer program processes the image, wherein the program identifies the markers by means of the submarkers and wherein positional data is retrieved by means of centers of said submarkers.

9. The method according to claim 8, wherein the computer program determines the validation of the transmitted image, wherein parameters regarding image quality and identification of the markers are evaluated, wherein image analysis proceeds upon confirmation of the parameters.

10. The method according to claim 7, wherein an actual size of a captured surface of the staircase part is calculated by the computer program based on contours of the captured surface, wherein the computer program corrects for lens distortion, angle variation and distance of the camera.

11. The method according to claim 1, wherein said method comprises the steps of:

capturing an image with a camera of the staircase part that is to be renovated, wherein a tread and/or a riser of said staircase part is provided with the one or more markers, said markers comprise submarkers on their surface, and wherein the image displays said staircase part and one or more markers;

analyzing said image by means of a computer-implemented algorithm, said algorithm defines positional information of said markers based on said image;

obtaining positional information of said camera in view of said markers and information on lens distortion of said camera;

defining a contour of said staircase part based on information obtained in said previous step; and defining, based on said obtained contours, a model for a renovation element, to be produced and placed on said existing staircase tread.

12. The method according to claim 1, wherein said staircase part is a stair tread comprising a tread, a nose and a riser.

13. The method according to claim 1, wherein said markers are made of a polymer.

14. The method according to claim 1, further comprising fitting the stair renovation element on said staircase part.

15. A system for producing a renovation element suited for renovating or replacing a staircase part comprising:

a digital measurement system designed to extract dimensional information regarding the dimensions of said staircase from only a single image of said staircase, a recording device, a processing unit designed to process said dimensional information, a transmitting device for relaying said dimensional information to a production unit, a production unit for producing a renovation element, wherein the production unit is a Computer Numerical Control (CNC) machine, and markers, wherein each of the markers is a positional tracking component used for the extraction of information, wherein said markers are designed to be positioned and/or attached to a surface of the staircase part of a staircase, wherein the markers include edge markers and center markers, wherein said edge markers are positioned at a corner of the staircase part, and wherein said center markers are positioned at a center of a surface of the staircase part.

16. The system according to claim 15, wherein each of the markers comprises one or more submarkers, wherein each of the submarkers is comprised of an outer and inner circle with pre-determined radius and center point, wherein a center of said circles coincides.

17. The system according to claim 16, wherein each of the submarkers contains a unique featured code, wherein the codes of the submarkers allow a determination of the orientation of a marker that is positioned on the surface, wherein the codes of the submarkers allow a determination of the identity of an individual marker.

18. The system according to claim 15, further comprising a computer program to process the image, wherein the computer program is capable of identifying the markers by analysis of a position of submarkers, wherein a center point of circles of the submarkers is able to determine the position of the marker, wherein the computer program is capable of determining validation of the image, permissive of an evaluation of parameters regarding image quality and identification of the markers, wherein image analysis is able to proceed upon confirmation of the parameters.

* * * * *